March 25, 1941.            C. H. OWENS                2,236,153
                         VINEGAR GENERATOR
                     Filed June 30, 1938          3 Sheets-Sheet 1
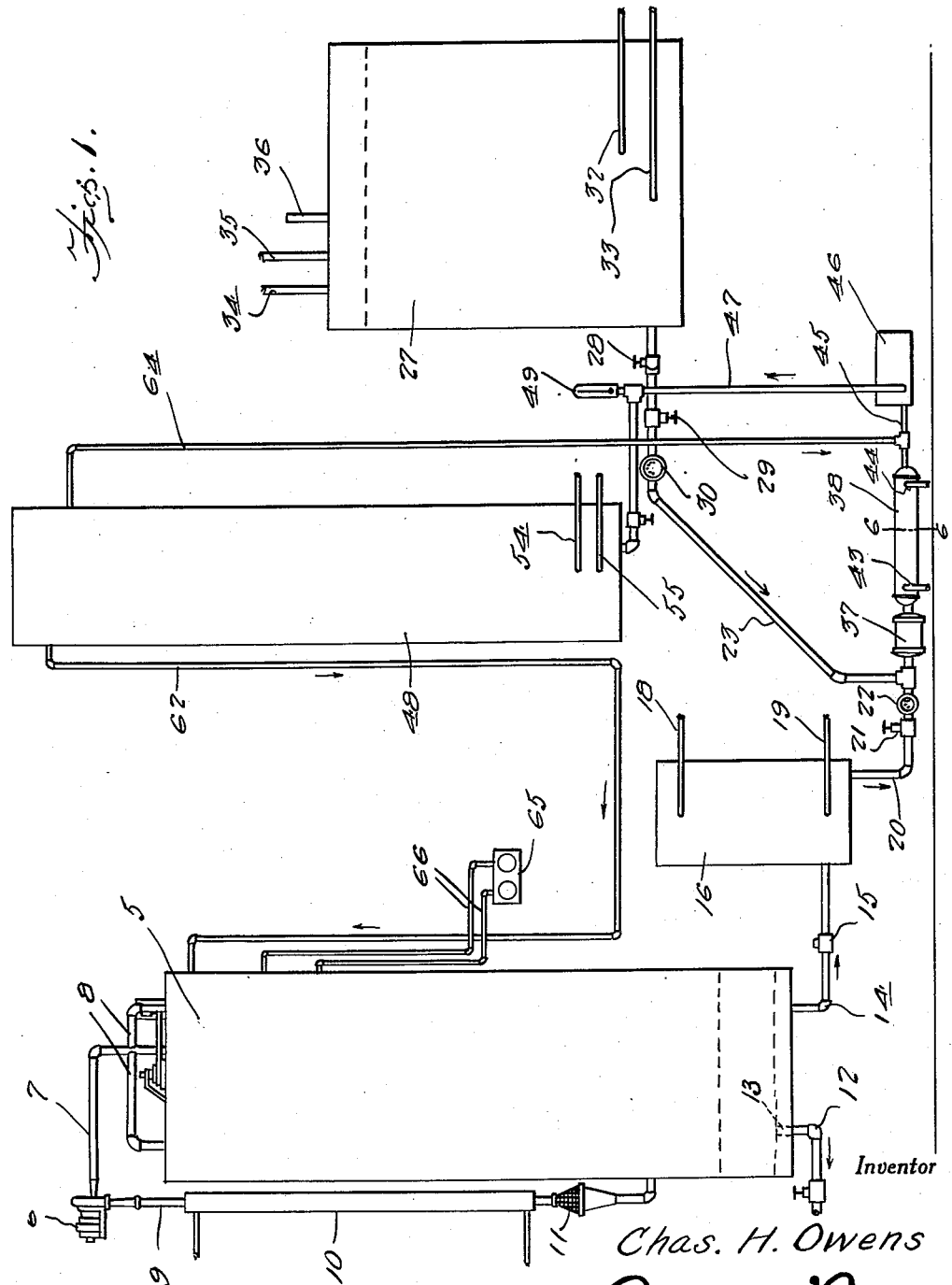
Inventor
Chas. H. Owens
By Clarence A. O'Brien
and Hyman Berman
Attorneys March 25, 1941.   C. H. OWENS   2,236,153
VINEGAR GENERATOR
Filed June 30, 1938   3 Sheets-Sheet 2

Inventor
Chas H. Owens

By Clarence A. O'Brien
and Hyman Berman
Attorneys

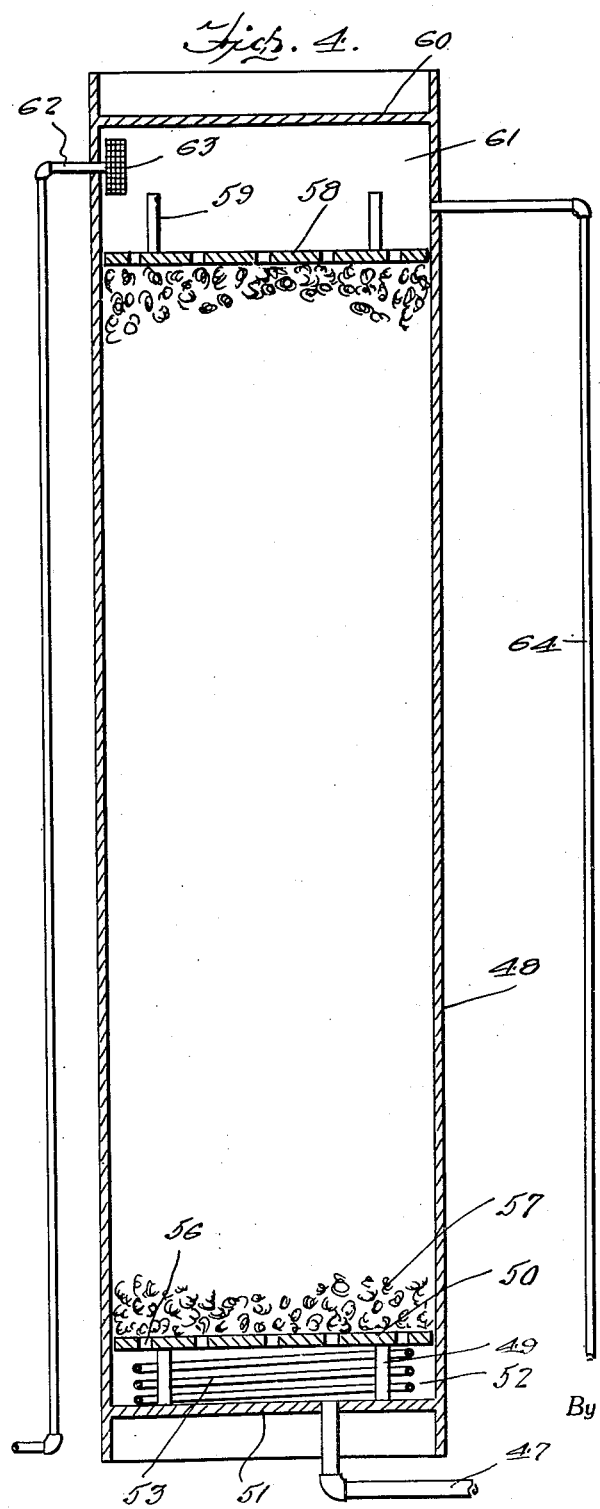
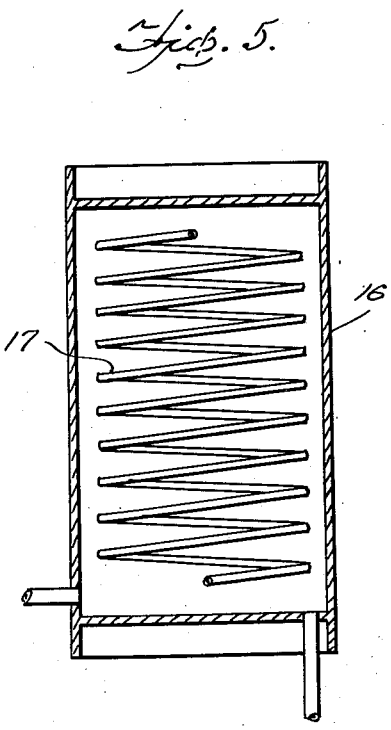
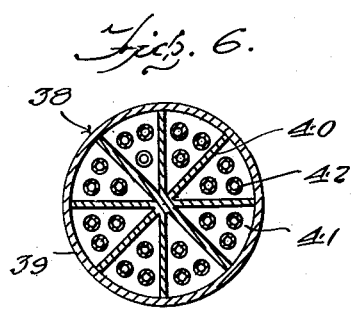

Patented Mar. 25, 1941

2,236,153

UNITED STATES PATENT OFFICE 2,236,153

VINEGAR GENERATOR

Charles H. Owens, Edgewater, N. J.

Application June 30, 1938, Serial No. 216,823

3 Claims. (Cl. 99—245)

The present invention relates to vinegar generators and has for its primary object to provide a generator tank within the bottom of which the finished product is adapted to be collected and to be drained therefrom into suitable storage receptacles, said generator tank embodying means for retaining a predetermined volume of the finished product to be mixed with a predetermined volume of raw material as the same is fed through the generator tanks during the generating process.

A further object of the invention is to provide means for heating the finished product which is to be mixed with the raw material, before the mixing thereof, as well as for regulating the temperature of the mixture, feeding the mixed material under pressure upwardly through a purifier tank to remove foam, fog and to restore the liquid to its natural clear state before passing from the purifier to the generator tank.

An additional object is to provide a feed line between the purifier and generator tanks to form a gas trap to prevent gas from working back from the generator to the purifier.

Other objects and advantages reside in the arrangement of the parts as more fully hereinafter described and claimed, reference being had to the accompanying drawings forming part hereof, wherein like numerals refer to like parts throughout, and in which—

Figure 1 is a side elevational view of the assembled apparatus.

Figure 4 is a vertical sectional view of the purifier tank.

Figure 5 is a similar view of the vacuum tank for heating the finished product, and Figure 6 is a transverse sectional view through the mixing chamber taken substantially on a line 6—6 of Figure 1.

Figures 2, 3:
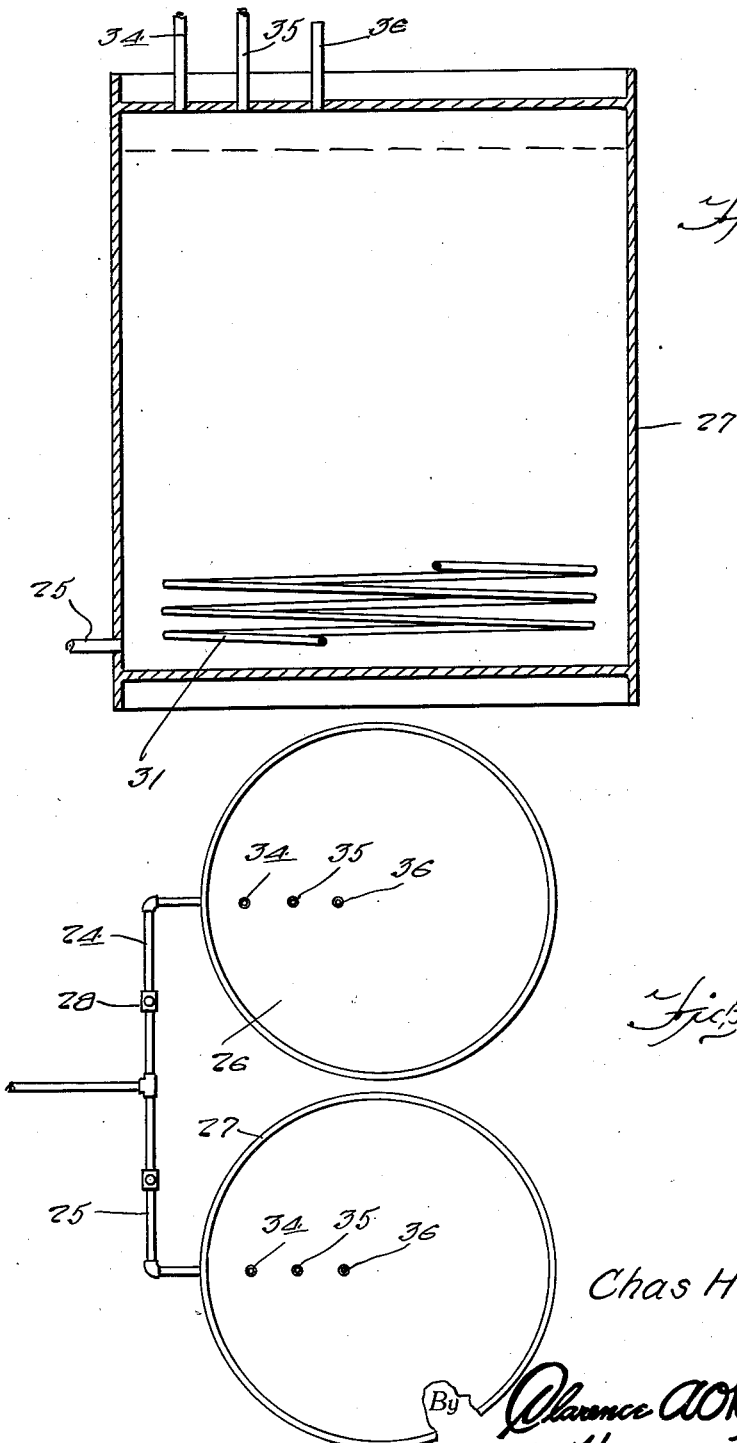
Figure 2 is a top plan view of the pair of tanks for the raw material.
Figure 3 is a vertical sectional view through one of said tanks.

Referring now to the drawings in detail, and with particular reference to Figure 1 of the drawings, the numeral 5 designates a generator tank of a construction disclosed in detail in my Patent No. 2,098,412, dated August 10, 1937, and which includes the air circulating fan of the electric motor driven type 6, the intake side of which is connected with one end of a pipe 7 and connected to branches 8 which extend downwardly through the top of the tank or drum 5. A pipe 9 extends downwardly from the discharge end of the fan 6 through a water jacket 10 and interposed in said pipe 9, below the water jacket is a screened air intake 11, the lower end of the pipe 9 extending into the drum 5 adjacent its lower portion.

Internally the drum 5 is of any suitable construction, preferably corresponding to that disclosed in my above mentioned Letters Patent and within which the finished product is adapted to collect in the lower portion of said drum. A drain pipe 12 is connected to the bottom of the drum 5 for draining the finished product to suitable storage receptacles. The drain pipe 12 extends upwardly into the bottom of the drum and has its intake end 13 positioned in spaced relation above the bottom of the drum as will be apparent from an inspection of Figure 1 of the drawings, whereby to retain a predetermined quantity of the finished product within the drum after the drum has been substantially drained for storage purposes.

Also connected to the bottom of the drum 5 is a drain pipe 14 having a valve 15 therein and leading to a vacuum tank 16. The vacuum tank is shown in detail in Figure 5 of the drawings and is provided with a coil 17 arranged therein, having its upper portion connected with a feed pipe 18 and its lower portion connected with a discharge pipe 19 extending from the vacuum tank and connected to a suitable source of hot water for heating the contents of the tank 16. A drain pipe 20 extends from the vacuum tank 16 having a control valve 21 therein as well as a meter 22. Also communicating with the pipe 20 is a feed pipe 23 from which branch pipes 24 and 25 extend leading respectively to raw material supply tanks 26 and 27. Each of the branch pipes have valves 28 therein and the feed pipe 23 is likewise provided with a valve 29 as well as a meter 30.

Each of the tanks 26 and 27 are provided with coils 31 having feed and discharge pipes 32 and 33 connected thereto and adapted to supply brine or other cooling medium to said coils for cooling the contents of said tanks. Feed pipes 34 and 35 enter the top of the tanks 26 and 27, one of said feed pipes being adapted to supply the tanks with alcohol while the other of said pipes is adapted to supply water in equal proportions which constitute the raw mixture for producing the vinegar. An air vent 36 is also provided for each of the tanks 26 and 27.

Immediately adjacent the junction of the pipes 20 and 23 is provided a filter 37, from which the fluid passing therethrough enters a mixing chamber designated generally at 38, said mixing chamber comprising a shell 39 of cylindrical form and having a plurality of longitudinally extending portions 40 therein defining longitudinally extending chambers 41. Each of the chambers contains a plurality of pipes 42 extending longitudinally of the shell, the pipes of the respective chambers having communication with each other at their end portions and the chambers 41 likewise having open communication at each end with each other and having feed and discharge pipes 43 and 44 respectively connected thereto for supplying cold or hot water to the chambers for regulating the temperature of the fluid passing through the pipes 42. The fluid, after leaving the mixing chamber 38, passes through a pipe 45 leading to a pump 46 which forces the fluid upwardly through a pipe 47 to the bottom of a purifier tank 48, said pipe 47 having a thermometer 49 interposed therein.

The purifier tank, shown in detail in Figure 4 of the drawings, is provided within its lower portion with posts 49 supporting a false bottom 50 in spaced relation above the bottom 51 of the tank to provide a chamber 52 therein and within which is positioned a coil 53 having feed and discharge pipes 54 and 55 communicating therewith and connected with a suitable source of cooling fluid for lowering the temperature of the mixture as it enters the purifier through the pipe 47.

The false bottom 50 is perforated as shown at 56 and the greater portion of the tank 48 is provided with beechwood shavings 57 tightly compressed within the tank and on top of which is positioned a perforated plate 58 provided with upstanding rods 59 adapted to contact the top 60 of the tank to maintain a compartment 61 within the upper portion thereof.

Extending through the side wall of the tank into the compartment 61 is a discharge pipe 62 having a screen 63 on its inner end and extending downwardly in substantially U-form, as clearly shown in Figure 1 of the drawings and adapted to communicate with the upper portion of the tank or drum 5. A pressure control pipe 64 connects the upper portion of the purifier tank 48 with the feed pipe 45 in advance of the pump 46 whereby excess pressure created in the purifier tank will be returned to the intake side of the pump.

Recording thermometers 65 are connected at vertically spaced points through pipes 66 with the drum 5.

In constructing the apparatus the vacuum tank 16 is positioned below the horizontal plane of the bottom of the drum 5 and the tanks 26 and 27 are positioned above the horizontal plane of the bottom of the drum 5 as well as above the horizontal plane of the vacuum tank 16 so that the fluid will flow from the respective tanks by gravity to the pump 46. Likewise, the intake end of the pipe 62 communicating with the purifier tank 48 is positioned above the horizontal plane of the discharge end of said pipe so that the fluid will gravitate through the pipe 62 into the upper end of the drum 5.

It will be apparent from the foregoing that the coils positioned in the respective tanks as well as in the mixing chamber 38 are capable of maintaining the mixture at a desired temperature to insure maximum efficiency.

It is believed the details of construction and manner of operation of the device will be readily understood from the foregoing without further detailed explanation.

Having thus described the invention, what I claim is—

1. In a vinegar generator, a generator drum for receiving the mixture in its upper portion and discharging the finished product at its lower end, a plurality of tanks containing the raw material, drain pipes leading from the raw material tanks and communicating with each other for mixing predetermined proportions of the contents of said tanks, a purifying tank means for forcing the mixed liquid under pressure upwardly through said purifying tank to the upper portion of said generator tank and a feed pipe connecting the upper portions of said tanks, said last named pipe extending in U-form to provide a gas trap therein.

2. In a vinegar generator, a generator drum for receiving the mixture in its upper portion and discharging the finished product at its lower end, a plurality of tanks containing the raw material, drain pipes leading from the raw material tanks and communicating with each other for mixing predetermined proportions of the contents of said tanks, a purifying tank means for forcing the mixed liquid under pressure upwardly through said purifying tank and a feed pipe leading from said purifying tank to the upper portion of said generator tank and a pressure return pipe extending from the upper portion of said purifying tank to the intake side of said pressure means and providing a recirculation system through the purifying tank of excess liquid fed thereto.

3. A vinegar generating apparatus comprising a generator tank adapted to receive the mixture at its upper portion and collect the finished product in its lower portion, a plurality of raw material tanks, drain pipes for the raw material tanks connected to each other for mixing predetermined proportions of the mixture as the same is drained from the respective tanks, means for regulating the temperature of the contents of the tanks before mixing thereof, means for regulating the temperature of the mixture, a purifying tank, a pump for forcing the mixture upwardly through the purifying tank, means for regulating the temperature of the mixture as it enters the purifier, a feed pipe leading from the rectifier to the generator and arranged to form a gas trap in the feed pipe and a pressure release pipe connecting the upper portion of the purifier with the intake end of the pump and providing a recirculation system between the pump and the purifying tank for excess liquid fed to the purifying tank.

CHARLES H. OWENS.